US008086392B2

(12) United States Patent
Anilovich et al.

(10) Patent No.: US 8,086,392 B2

(45) Date of Patent: Dec. 27, 2011

(54) POST OXYGEN SENSOR PERFORMANCE DIAGNOSTIC WITH MINIMUM AIR FLOW

(75) Inventors: Igor Anilovich, Walled Lake, MI (US); Jeffry A. Helmick, Oxford, MI (US); Richard B. Jess, Haslett, MI (US); John W. Siekkinen, Novi, MI (US); Christopher E. Whitney, Highland, MI (US); Robert C. Simon, Jr., Brighton, MI (US)

(73) Assignee: GM Global Technology Operations LLC

( * ) Notice: Subject to any disclaimer, the term of this patent is extended or adjusted under 35 U.S.C. 154(b) by 469 days.

(21) Appl. No.: 12/414,993

(22) Filed: Mar. 31, 2009

(65) Prior Publication Data

US 2010/0242933 A1 Sep. 30, 2010

(51) Int. Cl.
*G01M 15/10* (2006.01)

(52) U.S. Cl. ..................... 701/114; 701/109; 73/114.73; 123/688

(58) Field of Classification Search ............... 73/114.72, 73/114.73; 701/109, 114; 123/672, 688, 123/690

See application file for complete search history.

(56) References Cited

U.S. PATENT DOCUMENTS

| | | | | |
|---|---|---|---|---|
| 5,212,947 | A * | 5/1993 | Fujimoto et al. | 60/276 |
| 6,920,751 | B2 * | 7/2005 | Yasui et al. | 60/277 |
| 7,103,467 | B2 * | 9/2006 | Takahashi et al. | 701/109 |
| 7,201,160 | B2 * | 4/2007 | Yoshiume et al. | 123/688 |
| 7,248,960 | B2 * | 7/2007 | Ikemoto et al. | 701/114 |
| 7,387,011 | B2 * | 6/2008 | Fujiki et al. | 73/23.32 |
| 7,779,669 | B2 * | 8/2010 | Fukagai et al. | 73/23.32 |
| 7,954,364 | B2 * | 6/2011 | Shoda | 73/114.69 |

* cited by examiner

*Primary Examiner* — Erick Solis

(57) ABSTRACT

An engine control system includes an oxygen ($O_2$) sensor diagnostic module that diagnoses an $O_2$ sensor and requests a minimum air per cylinder (APC). A throttle actuator module controls a throttle to adjust a mass air flow based on the minimum APC.

20 Claims, 7 Drawing Sheets

POST OXYGEN SENSOR PERFORMANCE DIAGNOSTIC WITH MINIMUM AIR FLOW

FIELD

The present disclosure relates to post-converter oxygen sensor performance diagnostics.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An exhaust system includes a catalytic converter and oxygen ($O_2$) sensors. A pre-converter $O_2$ sensor measures $O_2$ entering the catalytic converter. A post-converter $O_2$ sensor measures the $O_2$ exiting the catalytic converter. The $O_2$ sensors may be diagnosed to determine whether the measurements taken are reliable.

The post-converter $O_2$ sensor generates a voltage output signal based on sensor measurements. For example, a properly functioning post-converter $O_2$ sensor may have a relatively quick response to changing levels of $O_2$. Conversely, a malfunctioning post-converter $O_2$ sensor may have a relatively slow response. Diagnosing the post-converter $O_2$ sensor may include monitoring the voltage output signal and determining whether a response time is above and/or below a threshold.

SUMMARY

An engine control system includes an oxygen ($O_2$) sensor diagnostic module that diagnoses an $O_2$ sensor and requests a minimum air per cylinder (APC). A throttle actuator module controls a throttle to adjust a mass air flow based on the minimum APC. In further features, the $O_2$ sensor diagnostic module requests a lean to rich transition and requests the minimum APC during the lean to rich transition.

In other features, the throttle actuator module controls the throttle based on the minimum APC when the minimum APC is a maximum of a plurality of APC requests. In still other features, the throttle actuator module suspends controlling the throttle based on the minimum APC when the minimum APC is less than at least one of a plurality of APC requests.

In still other features, the minimum APC includes a predetermined value. In other features, the $O_2$ sensor diagnostic module requests a rich to lean transition and requests the minimum APC during the rich to lean transition. In other features, the $O_2$ sensor diagnostic module requests the minimum APC before diagnosis of the $O_2$ sensor.

In further features, the $O_2$ sensor diagnostic module suspends requesting the minimum APC after diagnosis of the $O_2$ sensor. In other features, the $O_2$ sensor diagnostic module requests the minimum APC during diagnosis of the $O_2$ sensor. In further features, the $O_2$ sensor diagnostic module suspends requesting the minimum APC after diagnosis of the $O_2$ sensor.

A method for controlling an engine comprises requesting a minimum air per cylinder (APC); controlling a throttle to adjust a mass air flow based on the minimum APC; and diagnosing an $O_2$ sensor based on the APC. In further features, the method further comprises requesting a lean to rich transition and requesting the minimum APC during the lean to rich transition.

In other features, the method further comprises controlling the throttle based on the minimum APC when the minimum APC is a maximum of a plurality of APC requests. In still other features, the method further comprises suspending controlling the throttle based on the minimum APC when the minimum APC is less than at least one of a plurality of APC requests.

In still other features, the minimum APC includes a predetermined value. In still other features, the method further comprises requesting a rich to lean transition and requesting the minimum APC during the rich to lean transition. In still other features, the method further comprises requesting the minimum APC before diagnosis of the $O_2$ sensor.

In further features, the method further comprises suspending requesting the minimum APC after diagnosis of the $O_2$ sensor. In other features, the method further comprises requesting the minimum APC during diagnosis of the $O_2$ sensor. In further features, the method further comprises suspending requesting the minimum APC after diagnosis of the $O_2$ sensor.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
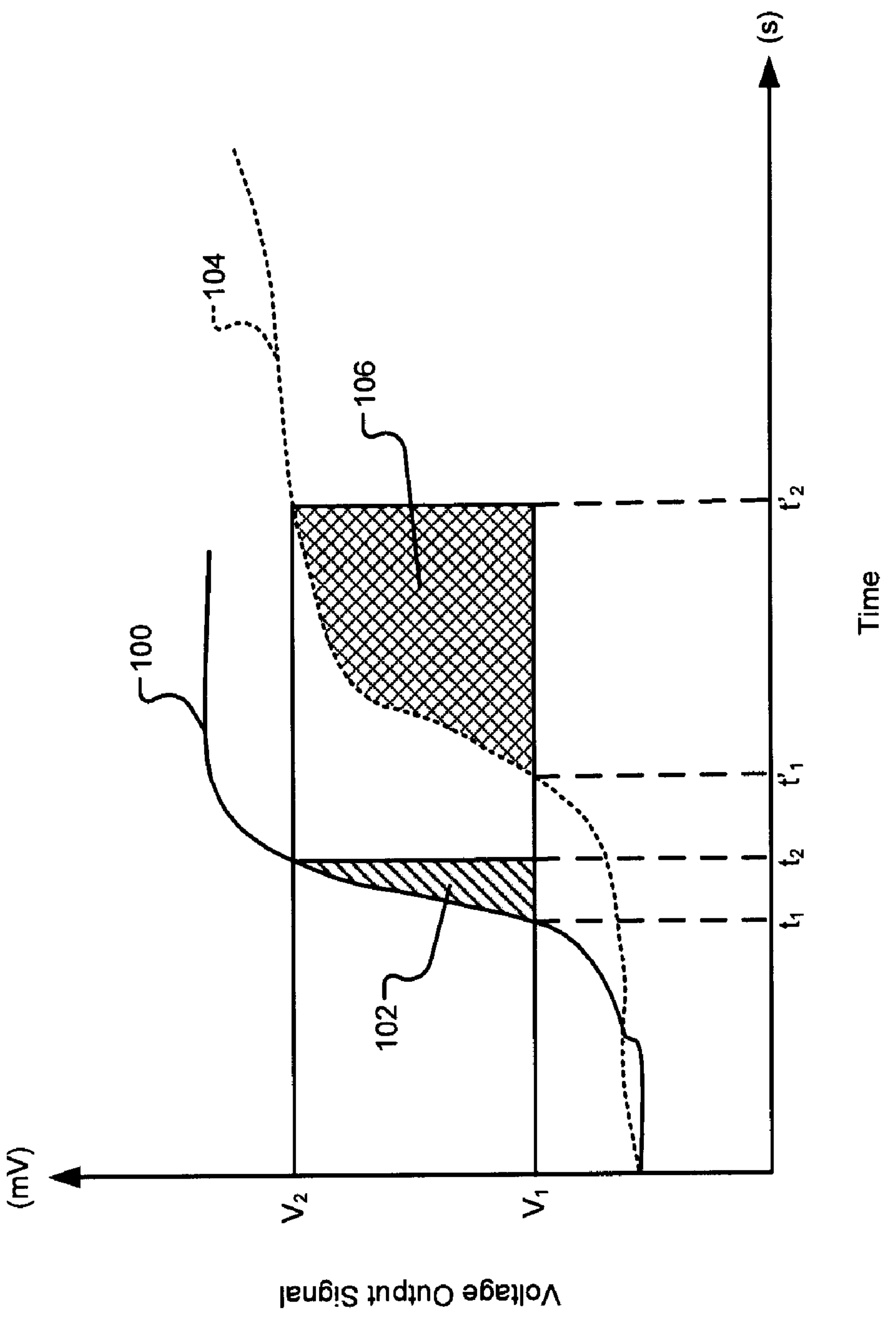
FIG. 1 is a graphical depiction of exemplary oxygen sensor signals according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

$O_2$ sensors (e.g. a pre-converter and a post-converter $O_2$ sensor) in an exhaust system may be diagnosed to determine whether $O_2$ measurements are reliable. The post-converter $O_2$ sensor is located at the outlet of the catalytic converter. Accordingly, diagnosing the post-converter $O_2$ sensor may be more effective when air flow through the catalytic converter is increased. For example, the catalytic converter decreases the amount of $O_2$ available to the post-converter $O_2$ sensor. Consequently, the catalytic converter has an adverse effect on the signal response of the post-converter $O_2$ sensor. The post-converter $O_2$ sensor provides a quicker signal response (i.e. response time is decreased) as air flow increases. The present disclosure implements a minimum air flow requirement during diagnosis of the post-converter $O_2$ sensor.

Referring now to FIG. 1, a graphical depiction of exemplary oxygen sensor signals according to the principles of the present disclosure is shown. A post-converter $O_2$ sensor generates a voltage output signal based on $O_2$ content of exhaust gases. The voltage output signal generated by a properly functioning post-converter $O_2$ sensor varies based on the $O_2$ content of the exhaust gas. A common characteristic of a malfunctioning post-converter $O_2$ sensor is a lazy or sluggish (i.e. slow) response. For example, with a malfunctioning post-converter $O_2$ sensor, an increased amount of time is required for the voltage output signal to transition from rich to lean and/or lean to rich.

A post-converter $O_2$ sensor performance diagnostic (POPD) monitors performance of the post-converter $O_2$ sensor by calculating an integrated area (IA) above or below the voltage output signal during a transition from rich to lean and/or lean to rich. As the signal transition speed decreases, the IA increases. The IA is normalized and compared to a threshold IA ($IA_{THR}$) to determine whether the signal has deteriorated to a degree that the post-converter $O_2$ sensor should be serviced or replaced.

The IA is calculated between first and second voltages $V_1$, $V_2$, respectively, and times $t_1$, $t_2$ at which the voltage output signal achieves the respective voltages. For example only, $V_1$ and $V_2$ may selected based on preliminary data analysis of the lean and rich transitions. The voltages are selected separately for the rich to lean and lean to rich transitions.

Figure 2:
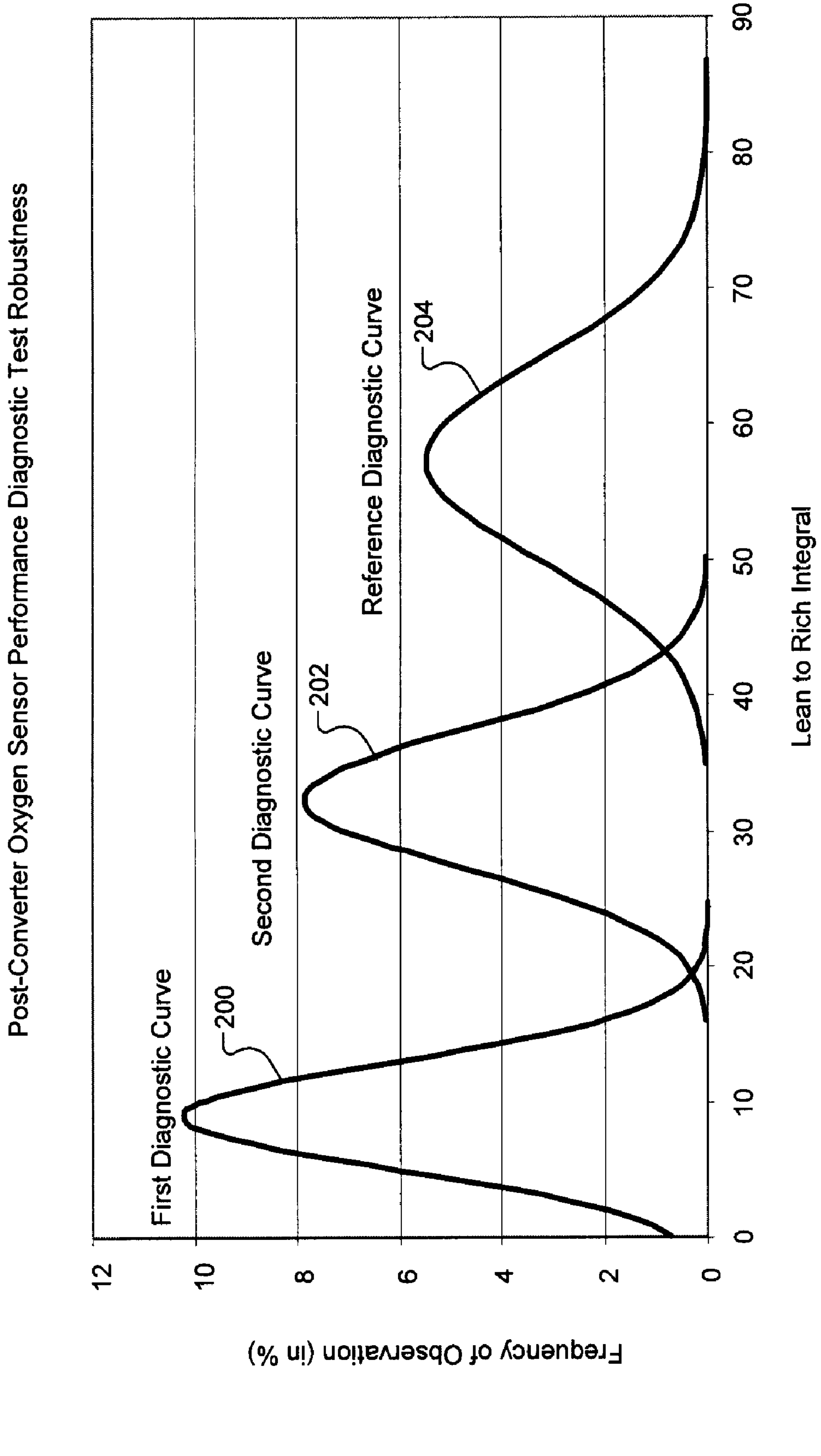
FIG. 2 is a graphical depiction of exemplary post-converter oxygen sensor performance diagnostic test results according to the principles of the present disclosure.

A properly functioning $O_2$ sensor response 100 represents the response of a properly functioning post-converter $O_2$ sensor during a lean to rich transition. An IA 102 is calculated based on the properly functioning $O_2$ sensor response 100. A malfunctioning $O_2$ sensor response 104 represents the response of a malfunctioning post-converter $O_2$ sensor during the lean to rich transition. An IA 106 is calculated based on the malfunctioning $O_2$ sensor response 104. By comparing each IA to $IA_{THR}$, a determination of whether the post-converter $O_2$ sensor is malfunctioning may be made Referring now to FIG. 2, a graphical depiction of exemplary post-converter oxygen sensor performance diagnostic test results according to the principles of the present disclosure is shown. The vertical axis represents frequency of observed test results (statistical density function) in percentage. The horizontal axis represents IA after normalization. The graph shows exemplary curves for post-converter $O_2$ sensor diagnostic test results. A reference best performance unacceptable sensor (BPUS) represents the best of unacceptable sensors.

A first diagnostic curve 200 represents data for an exemplary properly functioning unit diagnosed with elevated air flow (i.e. air flow above a minimum air flow). A second diagnostic curve 202 represents data for the exemplary properly functioning unit diagnosed without elevated air flow. A reference diagnostic curve 204 represents data for the BPUS diagnosed with elevated air flow. The bell curves are normalized with respect to air flow, and therefore are changed. The bell curves are shifted horizontally as air flow increases or decreases.

Each curve shows an exemplary range of possible values for normalized IA with respect to air flow. For example, the possible values for the reference diagnostic curve 204 range from approximately 35 to approximately 86. The possible values for the first diagnostic curve 200 range from 0 to approximately 25, and the possible values for the second diagnostic curve 202 range from approximately 17 to approximately 51. The graph illustrates the frequency of observed test results for each normalized IA. For example, the reference diagnostic curve 204 shows that approximately 5.5% of the time, the normalized IA is approximately 58.

During POPD, the normalized IA is compared to possible values from the reference diagnostic curve 204 to determine whether the post-converter $O_2$ sensor is working properly. The greater the IA values differ from the reference diagnostic curve 204, the easier it is to detect problems with the post-converter $O_2$ sensor. For example, an intersection between two of the curves makes it possible for the same normalized IA to be calculated for two post-converter $O_2$ sensors. Accordingly, it may be more difficult to distinguish between the corresponding post-converter $O_2$ sensors.

For example, the second diagnostic curve 202 and the reference diagnostic curve 204 overlap. Overlapping of the curves 202 and 204 between approximately 35 to approximately 51 on the horizontal axis increase the difficulty in determining whether the post-converter $O_2$ sensor is functioning properly or not. For example, the reference diagnostic curve 204 illustrates that it is unlikely, but possible, to have an IA as low as approximately 35. Similarly, the second diagnostic curve 202 illustrates that it is unlikely, but possible, to have an IA as high as approximately 51. Based on the second diagnostic curve 202 and the reference diagnostic curve 204, it is equally as likely to have an IA of roughly 43. In the case of the overlapping area, it would be difficult to distinguish between a properly functioning post-converter $O_2$ sensor and a malfunctioning post-converter $O_2$ sensor.

Conversely, there is practically no overlapping between the first diagnostic curve 200 and the reference diagnostic curve 204. Accordingly, the possible normalized IAs of the curves do not overlap and are readily distinguishable. The further apart the curves are from one another, the easier it is to distinguish between a properly functioning post-converter $O_2$ sensor and an $O_2$ that is malfunctioning. For example, the lowest normalized IA possible for the reference diagnostic curve 204 is approximately 35 and the highest possible normalized IA for the first diagnostic curve 200 is approximately 25. The gap between the two curves 200 and 204 illustrates that it is much easier to distinguish between a properly functioning post-converter $O_2$ sensor and one that is malfunctioning.

Figure 3:
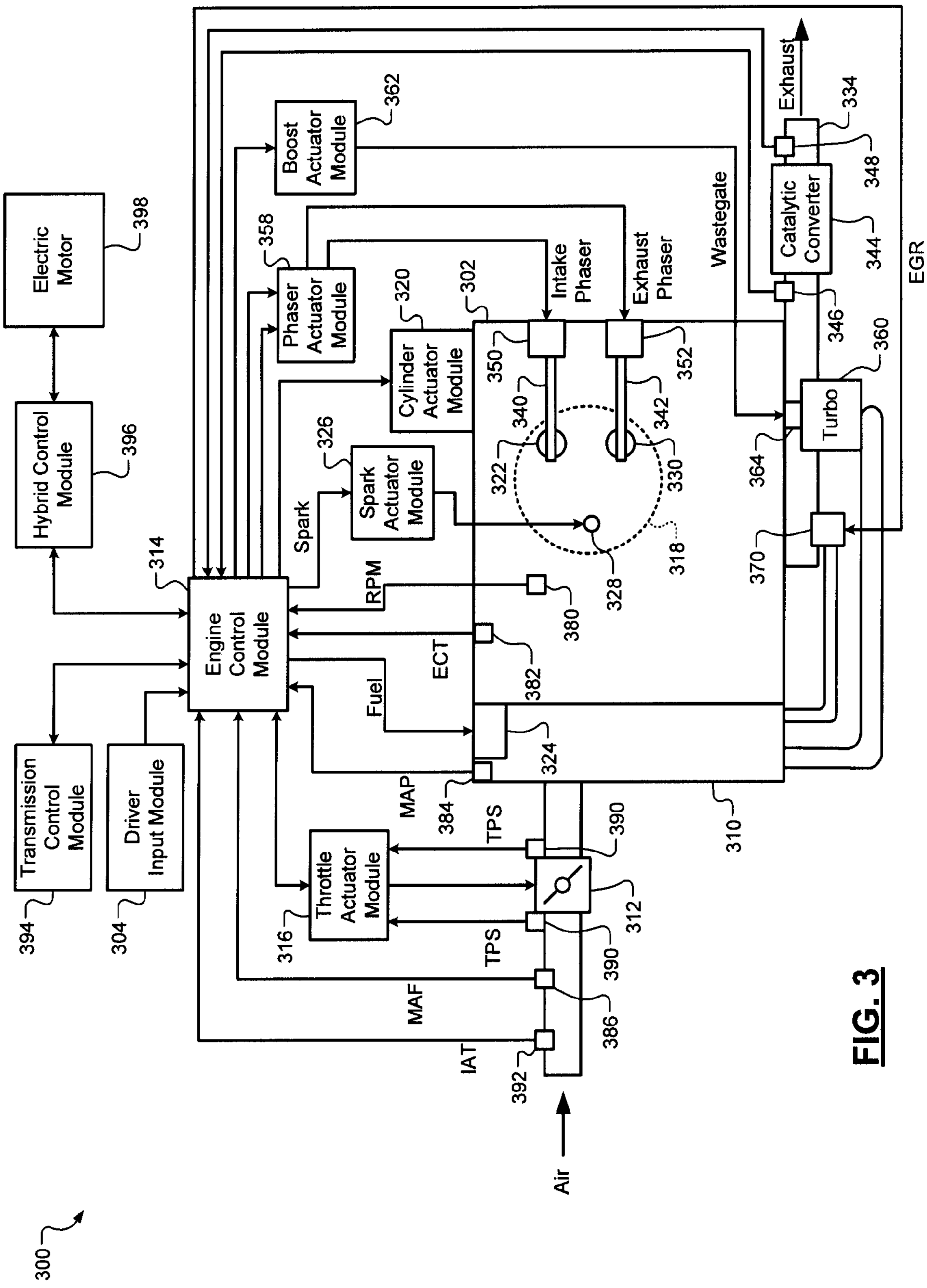
FIG. 3 is a functional block diagram of an exemplary engine system according to the principles of the present disclosure.

Referring now to FIG. 3, a functional block diagram of an exemplary engine system 300 according to the principles of the present disclosure is shown. The engine system 300 includes an engine 302 that combusts an air/fuel mixture to produce drive torque for a vehicle based on a driver input module 304. While a spark ignition, gasoline type engine is described herein, the present disclosure is applicable to other types of torque producers, not limited to gasoline type engines, diesel type engines, propane type engines, and hybrid type engines.

Air is drawn into an intake manifold 310 through a throttle valve 312. An engine control module (ECM) 314 commands a throttle actuator module 316 to regulate opening of the throttle valve 312 to control the amount of air drawn into the intake manifold 310. Air from the intake manifold 310 is drawn into cylinders of the engine 302. While the engine 302 may include multiple cylinders, for illustration purposes, a single representative cylinder 318 is shown. For example only, the engine 302 may include 2, 3, 4, 5, 6, 8, 10, and/or 12 cylinders. The ECM 314 may instruct a cylinder actuator module 320 to selectively deactivate some of the cylinders to improve fuel economy.

Air from the intake manifold 310 is drawn into the cylinder 318 through an intake valve 322. The ECM 314 controls the amount of fuel injected by a fuel injection system 324. The fuel injection system 324 may inject fuel into the intake manifold 310 at a central location or may inject fuel into the intake manifold 310 at multiple locations, such as near the intake valve of each of the cylinders. Alternatively, the fuel injection system 324 may inject fuel directly into the cylinders.

The injected fuel mixes with the air and creates the air/fuel mixture in the cylinder 318. A piston (not shown) within the cylinder 318 compresses the air/fuel mixture. Based upon a signal from the ECM 314, a spark actuator module 326 energizes a spark plug 328 in the cylinder 318, which ignites the air/fuel mixture. The timing of the spark may be specified relative to the time when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 330. The byproducts of combustion are exhausted from the vehicle via an exhaust system 334.

The exhaust system 334 includes a catalytic converter 344, a pre-converter $O_2$ sensor 346, and a post-converter $O_2$ sensor 348. The pre-converter $O_2$ sensor 346 is located upstream (with respect to the exhaust) of the catalytic converter 344, while the post-converter $O_2$ sensor 348 is located downstream of the catalytic converter 344.

The catalytic converter 344 controls emissions by increasing the rate of oxidization of hydrocarbons (HC) and carbon monoxide (CO) and the rate of reduction of nitrogen oxides ($NO_x$). To enable oxidization, the catalytic converter 344 requires $O_2$. The $O_2$ storage capacity of the catalytic converter 344 is indicative of an efficiency in oxidizing the HC and CO and in reducing $NO_x$.

The pre-converter $O_2$ sensor 346 communicates with the ECM 314 and measures the $O_2$ content of the exhaust stream entering the catalytic converter 344. The post-converter $O_2$ sensor 348 communicates with the ECM 314 and measures the $O_2$ content of the exhaust stream exiting the catalytic converter 344.

Performance diagnostics are performed on the pre-converter $O_2$ sensor 346 and the post-converter $O_2$ sensor 348 to determine whether the sensors are working properly. For example, the efficiency of catalytic converter monitoring may be decreased when one or more of the sensors 346 and 348 is not functioning properly.

The intake valve 322 may be controlled by an intake camshaft 340, while the exhaust valve 330 may be controlled by an exhaust camshaft 342. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 320 may deactivate cylinders by halting provision of fuel and spark and/or disabling their exhaust and/or intake valves.

The time at which the intake valve 322 is opened may be varied with respect to piston TDC by an intake cam phaser 350. The time at which the exhaust valve 330 is opened may be varied with respect to piston TDC by an exhaust cam phaser 352. A phaser actuator module 358 controls the intake cam phaser 350 and the exhaust cam phaser 352 based on signals from the ECM 314.

The engine system 300 may include a boost device that provides pressurized air to the intake manifold 310. For example, FIG. 3 depicts a turbocharger 360. The turbocharger 360 is powered by exhaust gases flowing through the exhaust system 334, and provides a compressed air charge to the intake manifold 310. The air used to produce the compressed air charge may be taken from the intake manifold 310.

A wastegate 364 may allow exhaust gas to bypass the turbocharger 360, thereby reducing the turbocharger's output (or boost). The ECM 314 controls the turbocharger 360 via a boost actuator module 362. The boost actuator module 362 may modulate the boost of the turbocharger 360 by controlling the position of the wastegate 364. The compressed air charge is provided to the intake manifold 310 by the turbocharger 360. An intercooler (not shown) may dissipate some of the compressed air charge's heat, which is generated when air is compressed and may also be increased by proximity to the exhaust system 334. Alternate engine systems may include a supercharger that provides compressed air to the intake manifold 310 and is driven by the crankshaft.

The engine system 300 may include an exhaust gas recirculation (EGR) valve 370, which selectively redirects exhaust gas back to the intake manifold 310. In various implementations, the EGR valve 370 may be located after the turbocharger 360. The engine system 300 may measure the speed of the crankshaft in revolutions per minute (RPM) using an RPM sensor 380. The temperature of the engine coolant may be measured using an engine coolant temperature (ECT) sensor 382. The ECT sensor 382 may be located within the engine 302 or at other locations where the coolant is circulated, such as a radiator (not shown).

The pressure within the intake manifold 310 may be measured using a manifold absolute pressure (MAP) sensor 384. In various implementations, engine vacuum may be measured, where engine vacuum is the difference between ambient air pressure and the pressure within the intake manifold 310. The mass of air flowing into the intake manifold 310 may be measured using a mass air flow (MAF) sensor 386. In various implementations, the MAF sensor 386 may be located in a housing with the throttle valve 312.

The throttle actuator module 316 may monitor the position of the throttle valve 312 using one or more throttle position sensors (TPS) 390. The ambient temperature of air being drawn into the engine system 300 may be measured using an intake air temperature (IAT) sensor 392. The ECM 314 may use signals from the sensors to make control decisions for the engine system 300.

The ECM 314 may communicate with a transmission control module 394 to coordinate shifting gears in a transmission (not shown). For example, the ECM 314 may reduce torque during a gear shift. The ECM 314 may communicate with a hybrid control module 396 to coordinate operation of the engine 302 and an electric motor 398. The electric motor 398 may also function as a generator, and may be used to produce electrical energy for use by vehicle electrical systems and/or for storage in a battery. In various implementations, the ECM 314, the transmission control module 394, and the hybrid control module 396 may be integrated into one or more modules.

To abstractly refer to the various control mechanisms of the engine 302, each system that varies an engine parameter may be referred to as an actuator. For example, the throttle actuator module 316 can change the blade position, and therefore the opening area, of the throttle valve 312. The throttle actuator module 316 can therefore be referred to as an actuator, and the throttle opening area can be referred to as an actuator position.

Similarly, the spark actuator module 326 can be referred to as an actuator, while the corresponding actuator position is amount of spark advance. Other actuators include the boost actuator module 362, the EGR valve 370, the phaser actuator module 358, the fuel injection system 324, and the cylinder actuator module 320. The term actuator position with respect to these actuators may correspond to boost pressure, EGR valve opening, intake and exhaust cam phaser angles, air/fuel ratio, and number of cylinders activated, respectively.

Figure 4:
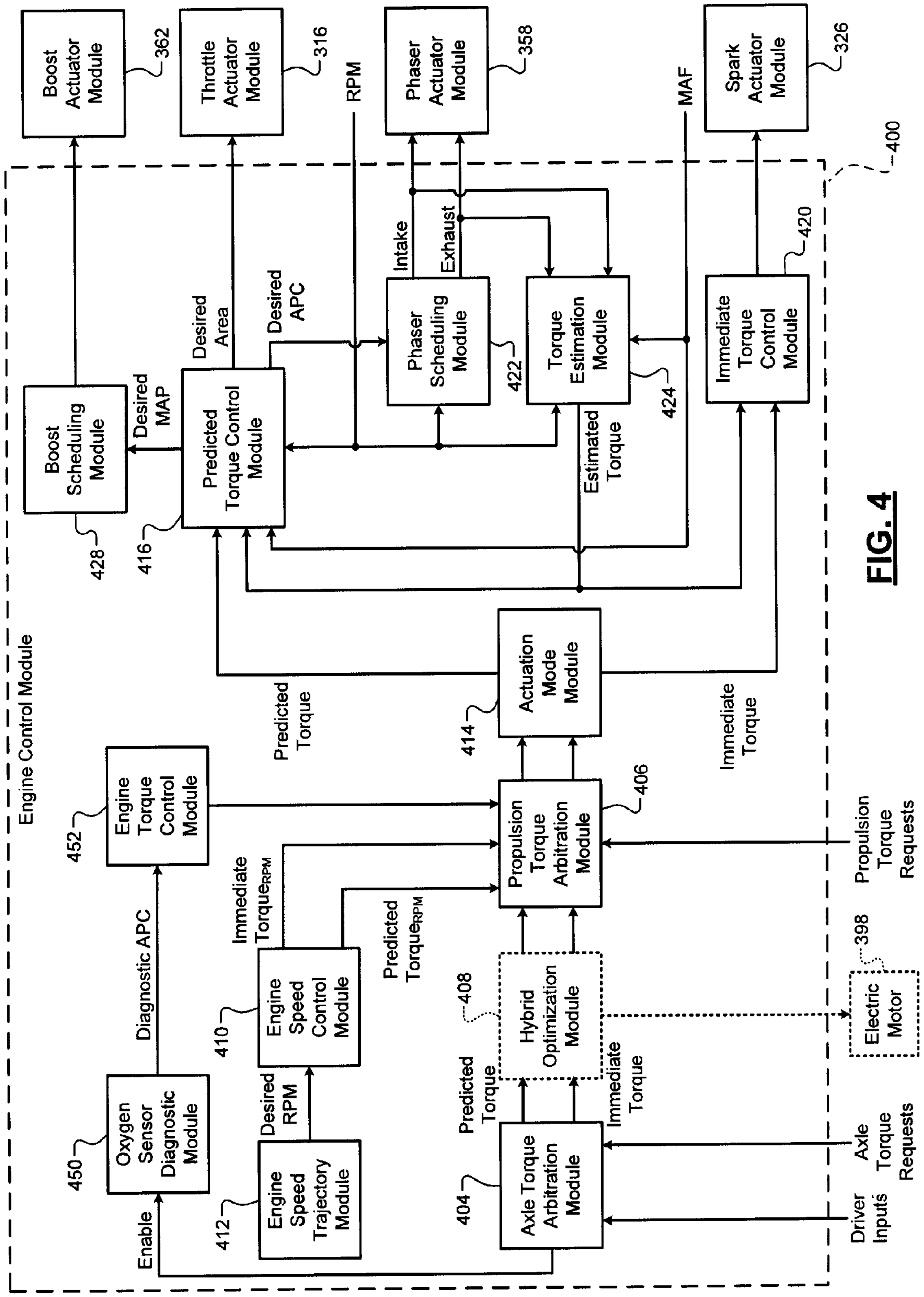
FIG. 4 is a functional block diagram of an exemplary engine control system according to the principles of the present disclosure.

Referring now to FIG. 4, a functional block diagram of an exemplary engine control system according to the principles of the present disclosure is shown. An engine control module (ECM) 400 includes an axle torque arbitration module 404. The axle torque arbitration module 404 arbitrates between driver inputs from the driver input module 304 and other axle torque requests. For example, driver inputs may include accelerator pedal position. Other axle torque requests may include torque reduction requested during wheel slip by a traction control system and torque requests to control vehicle speed from a cruise control system.

Axle torque requests may also include requests from an adaptive cruise control module, which may vary a torque request to maintain a predetermined following distance. Axle torque requests may also include torque increases due to negative wheel slip, such as where a tire of the vehicle slips with respect to the road surface when the torque produced by the engine is negative.

Axle torque requests may also include brake torque management requests and torque requests intended to prevent vehicle over-speed conditions. Brake torque management requests may reduce engine torque to ensure that engine torque does not exceed the ability of the brakes to hold the vehicle when the vehicle is stopped. Axle torque requests may also be made by chassis stability control systems. Axle torque requests may further include torque cutoff requests, such as may be generated when a critical fault is detected.

The axle torque arbitration module 404 outputs a predicted torque and an immediate torque. The predicted torque is the amount of torque that will be required in the future to meet the driver's torque and/or speed requests. The immediate torque is the torque required at the present moment to meet temporary torque requests, such as torque reductions when traction control senses wheel slippage.

The immediate torque may be achieved by engine actuators that respond quickly, while slower engine actuators are targeted to achieve the predicted torque. For example, a spark actuator may be able to quickly change spark advance, while cam phaser or throttle actuators may be slower to respond. The axle torque arbitration module 404 outputs the predicted torque and the immediate torque to a propulsion torque arbitration module 406.

In various implementations, the axle torque arbitration module 404 may output the predicted torque and immediate torque to a hybrid optimization module 408. The hybrid optimization module 408 determines how much torque should be produced by the engine and how much torque should be produced by the electric motor 398. The hybrid optimization module 408 then outputs modified predicted and immediate torque values to the propulsion torque arbitration module 406. In various implementations, the hybrid optimization module 408 may be implemented in the hybrid control module 396.

The propulsion torque arbitration module 406 arbitrates between the predicted and immediate torque and propulsion torque requests. Propulsion torque requests may include torque reductions for engine over-speed protection and shifting gears, and torque increases for stall prevention. Propulsion torque requests may also include torque requests from a speed control module, which may control engine speed during idle and coastdown, such as when the driver removes their foot from the accelerator pedal.

Propulsion torque requests may also include a clutch fuel cutoff, which may reduce engine torque when the driver depresses the clutch pedal in a manual transmission vehicle. Various torque reserves may also be provided to the propulsion torque arbitration module 406 to allow for fast realization of those torque values should they be needed. For example, a reserve may be applied for air conditioning compressor turn-on and for power steering pump torque demands.

A catalyst light-off or cold start emissions process may vary spark advance for an engine. A corresponding propulsion torque request may be made to balance out the change in spark advance. In addition, the air-fuel ratio of the engine and/or the mass air flow of the engine may be varied, such as by diagnostic intrusive equivalence ratio testing and/or new engine purging. Corresponding propulsion torque requests may be made to offset these changes.

Propulsion torque requests may also include a shutoff request, which may be initiated by detection of a critical fault. For example, critical faults may include vehicle theft detection, stuck starter motor detection, electronic throttle control problems, and unexpected torque increases. In various implementations, various requests, such as shutoff requests, may not be arbitrated. For example, they may always win arbitration or may override arbitration altogether. The propulsion torque arbitration module 406 may still receive these requests so that, for example, appropriate data can be fed back to other torque requesters.

The propulsion torque arbitration module 406 arbitrates between torque requests from the axle torque arbitration module 404 or the hybrid optimization module 408, an engine speed control module 410, and other propulsion torque requests. Other propulsion torque requests may include, for example, torque reductions for engine over-speed protection and torque increases for stall prevention.

The engine speed control module 410 outputs a predicted and immediate torque request to the propulsion torque arbitration module 406. The propulsion torque arbitration module 406 may simply select the torque requests from the engine speed control module 410 when the ECM 314 is in engine speed control mode. The engine speed control mode may be enabled when the driver takes their foot off the pedal. The engine speed control mode may then be used for vehicle coastdown as well as when the vehicle is idling. The engine speed control mode may be selected when the predicted torque requested by the axle torque arbitration module 404 is less than a calibrated torque value.

The engine speed control module 410 receives a desired RPM from an RPM trajectory module 412. The RPM trajectory module 412 determines a desired RPM for engine speed control mode. For example only, the RPM trajectory module 412 may output a linearly decreasing engine speed until the engine speed reaches an idle engine speed. The RPM trajectory module 412 may then continue outputting the idle engine speed.

In various implementations, the RPM trajectory module 412 may function as described in commonly assigned U.S. Pat. No. 6,405,587, issued on Jun. 18, 2002 and entitled "System and Method of Controlling the Coastdown of a Vehicle," the disclosure of which is expressly incorporated herein by reference in its entirety.

An actuation mode module 414 receives the predicted torque and the immediate torque from the propulsion torque arbitration module 406. Based upon a mode setting, the actuation mode module 414 determines how the predicted and immediate torques will be achieved. For example, changing the throttle valve 312 allows for a wide range of torque control. However, opening and closing the throttle valve 312 is relatively slow.

Disabling cylinders provides for a wide range of torque control, but may produce drivability and emissions concerns. Changing spark advance is relatively fast, but does not provide much range of control. In addition, the amount of control possible with spark (spark capacity) changes as the amount of air entering the cylinder 318 changes.

The throttle valve 312 may be closed just enough so that the desired immediate torque can be achieved by retarding the spark as far as possible. This provides for rapid resumption of the previous torque, as the spark can be quickly returned to its calibrated timing, which generates maximum torque. In this way, the use of relatively slowly-responding throttle valve corrections is minimized by maximizing the use of quickly-responding spark retard.

The approach the actuation mode module 414 takes in meeting the immediate torque request is determined by a mode setting. The mode setting provided to the actuation mode module 414 may include an inactive mode, a pleasible mode, a maximum range mode, and an auto actuation mode.

In the inactive mode, the actuation mode module 414 may ignore the immediate torque request. For example, the actuation mode module 414 may output the predicted torque to a predicted torque control module 416. The predicted torque control module 416 converts the predicted torque to desired actuator positions for slow actuators. For example, the predicted torque control module 416 may control desired manifold absolute pressure (MAP), desired throttle area, and/or desired air per cylinder (APC).

An immediate torque control module 420 determines desired actuator positions for fast actuators, such as desired spark advance. The actuation mode module 414 may instruct the immediate torque control module 420 to set the spark advance to a calibrated value, which achieves the maximum possible torque for a given airflow. In the inactive mode, the immediate torque request does not therefore reduce the amount of torque produced or impact spark advance from calibrated values.

In the pleasible mode, the actuation mode module 414 may attempt to achieve the immediate torque request using only spark retard. This may mean that if the desired torque reduction is greater than the spark reserve capacity (amount of torque reduction achievable by spark retard), the torque reduction will not be achieved. The actuation mode module 414 may therefore output the predicted torque to the predicted torque control module 416 for conversion to a desired throttle area. The actuation mode module 414 may output the immediate torque request to the immediate torque control module 420, which will retard the spark as much as possible to attempt to achieve the immediate torque.

In the maximum range mode, the actuation mode module 414 may instruct the cylinder actuator module 320 to turn off one or more cylinders to achieve the immediate torque request. The actuation mode module 414 may use spark retard for the remainder of the torque reduction by outputting the immediate torque request to the immediate torque control module 420. If there is not enough spark reserve capacity, the actuation mode module 414 may reduce the predicted torque request going to the predicted torque control module 416.

In the auto actuation mode, the actuation mode module 414 may decrease the predicted torque request output to the predicted torque control module 416. The predicted torque may be reduced only so far as is necessary to allow the immediate torque control module 420 to achieve the immediate torque request using spark retard.

The immediate torque control module 420 receives an estimated torque from a torque estimation module 424 and sets spark advance using the spark actuator module 326 to achieve the desired immediate torque. The estimated torque may represent the amount of torque that could immediately be produced by setting the spark advance to a value calibrated to produce the greatest torque. The immediate torque control module 420 can therefore select a spark advance that reduces the estimated torque to the immediate torque.

The predicted torque control module 416 also receives the estimated torque and may receive a measured mass air flow (MAF) signal and an engine revolutions per minute (RPM) signal. The predicted torque control module 416 generates a desired manifold absolute pressure (MAP) signal, which is output to a boost scheduling module 428.

The boost scheduling module 428 uses the desired MAP signal to control the boost actuator module 362. The boost actuator module 362 then controls a turbocharger and/or a supercharger. The predicted torque control module 416 generates a desired area signal, which is output to the throttle actuator module 316. The throttle actuator module 316 then regulates the throttle valve 312 to produce the desired throttle area.

The predicted torque control module 416 generates a desired APC signal, which is output to a phaser scheduling module 422. Based on the desired APC signal and the RPM signal, the phaser scheduling module 422 commands the intake and/or exhaust cam phasers 348 and 350 to calibrated values using the phaser actuator module 358.

The torque estimation module 424 uses the commanded intake and exhaust cam phaser positions along with the MAF signal to determine the estimated torque. Alternatively, the torque estimation module 424 may use actual or measured phaser positions. Further discussion of torque estimation can be found in commonly assigned U.S. Pat. No. 6,704,638 entitled "Torque Estimator for Engine RPM and Torque Control," the disclosure of which is incorporated herein by reference in its entirety.

An oxygen sensor diagnostic module 450 performs POPD testing on the post-converter $O_2$ sensor 348. Testing is performed or enabled during non-intrusive conditions such as a deceleration mode. For example, the deceleration mode may occur when a user does not request more torque (e.g. when the user maintains speed or applies vehicle brakes to slow down or stop). The axle torque arbitration module 404 may trigger the oxygen sensor diagnostic module 450 when the non-intrusive conditions exist. For example, the axle torque arbitration module 404 may output an enable signal when the non-intrusive conditions exist. It is anticipated that testing may be enabled during intrusive conditions.

The oxygen sensor diagnostic module 450 monitors the voltage output signal of the post-converter $O_2$ sensor 348 during lean to rich and rich to lean transitions. During lean to rich transitions, the oxygen sensor diagnostic module 450 may request a minimum APC. For example, the oxygen sensor diagnostic module 450 may generate a diagnostic APC signal when the minimum APC is requested. In various implementations, the diagnostic APC signal may be generated during rich to lean transitions. For example, the diagnostic APC signal may be generated during rich to lean transitions in hybrid vehicles. The diagnostic APC signal is transmitted to an engine torque control module 452.

The engine torque control module 452 determines a minimum predicted torque based on minimum APC requests. The engine torque control module 452 arbitrates between the minimum APC requests and generates a minimum predicted torque request. For example only, the engine torque control module 452 may arbitrate between throttle control minimum APC, fuel injector minimum APC, combustion APC, and the minimum APC from the oxygen sensor diagnostic module 450.

Figure 5:
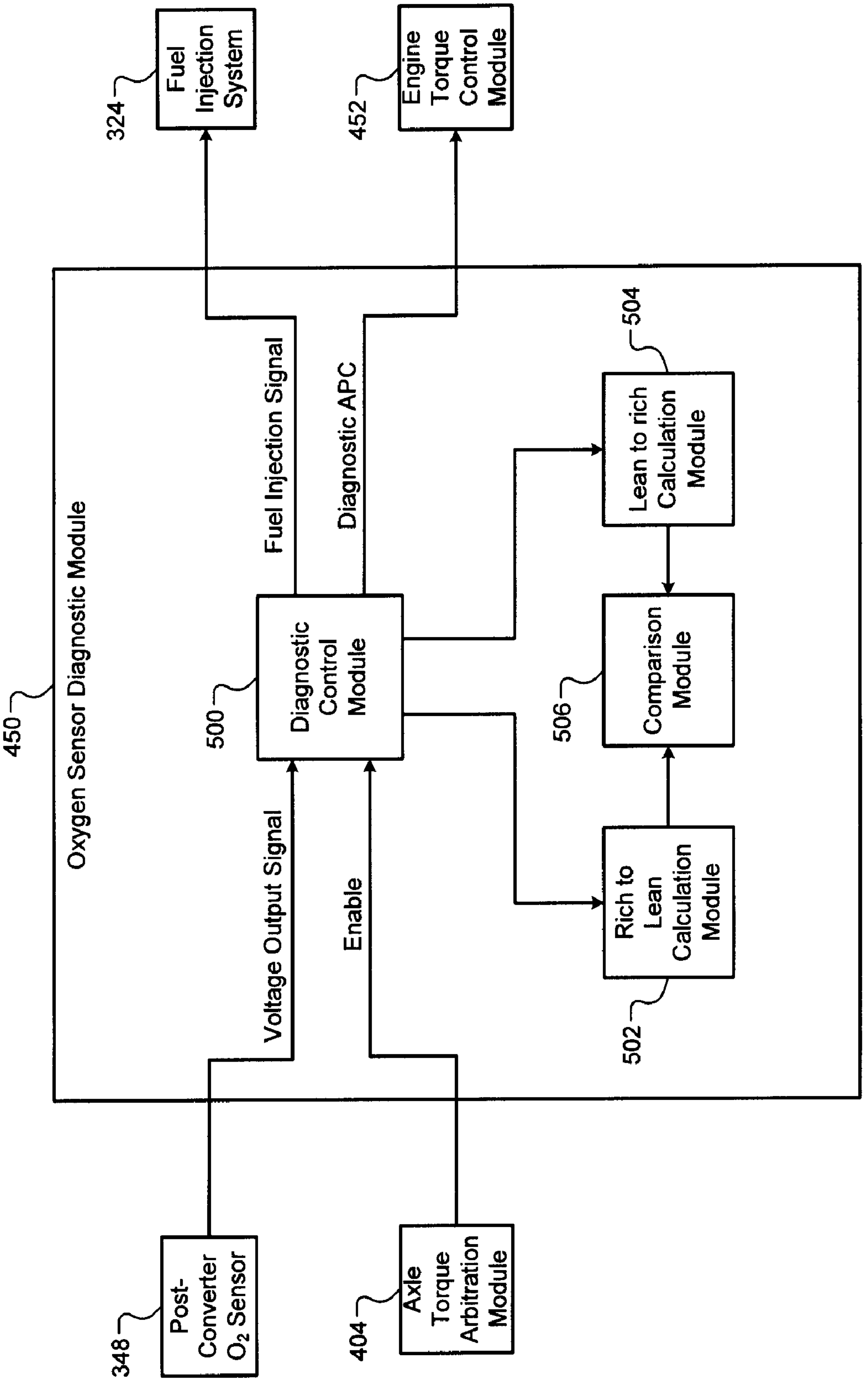
FIG. 5 is a functional block diagram of an exemplary implementation of the oxygen sensor diagnostic module of FIG. 4 according to the principles of the present disclosure.

Referring now to FIG. 5, a functional block diagram of an exemplary implementation of the oxygen sensor diagnostic module of FIG. 4 is shown. A diagnostic control module 500 receives the enable signal when the non-intrusive conditions exist. For example only, the enable signal may be received from the axle torque arbitration module 404. When the enable signal is received, the diagnostic control module 500 initiates a test of the post-converter $O_2$ sensor 348 and enables enrichment of the air/fuel mixture. For example only, a fuel injection signal may be transmitted to the fuel injection system 324. The fuel injection system 324 controls a rich to lean transition. Subsequently, the fuel injection system 324 controls a lean to rich transition occurs. The diagnostic control module 500 monitors the voltage output signal of the post-converter $O_2$ sensor 348 during the rich to lean and lean to rich transitions.

The oxygen sensor diagnostic module may abort the test when the non-intrusive conditions no longer exist. For example only, if the POPD test is enabled and enrichment of the air/fuel mixture is taking place, the test may be aborted when a driver requests a torque increase.

The diagnostic control module 500 monitors the voltage output signal and determines whether the air/fuel mixture is transitioning from rich to lean or lean to rich. If the diagnostic control module 500 determines that the transition is from rich to lean, then the voltage output signal is transmitted to a rich to lean calculation module 502. If the transition is from lean to rich, then the diagnostic control module 500 transmits the voltage output signal to a lean to rich calculation module 504 and generates the diagnostic APC signal. It is anticipated that the diagnostic control module 500 may generate the diagnostic APC signal when transmitting the voltage output signal to the rich to lean calculation module 502. It is also anticipated that the diagnostic control module 500 may generate the diagnostic APC signal at any time during operation.

The rich to lean calculation module 502 and the lean to rich calculation module 504 calculate IA based on the voltage output signal and normalize the IA. The normalized IA is transmitted to a comparison module 506. The comparison module 506 compares the normalized IA to $I_{ATHR}$. If the normalized IA is greater than or equal to $I_{ATHR}$, then the comparison module 506 determines that the post-converter $O_2$ sensor 348 is malfunctioning. If the normalized IA is less than $I_{ATHR}$, then the comparison module 506 determines that the post-converter $O_2$ sensor 348 is functioning properly.

Figure 6:
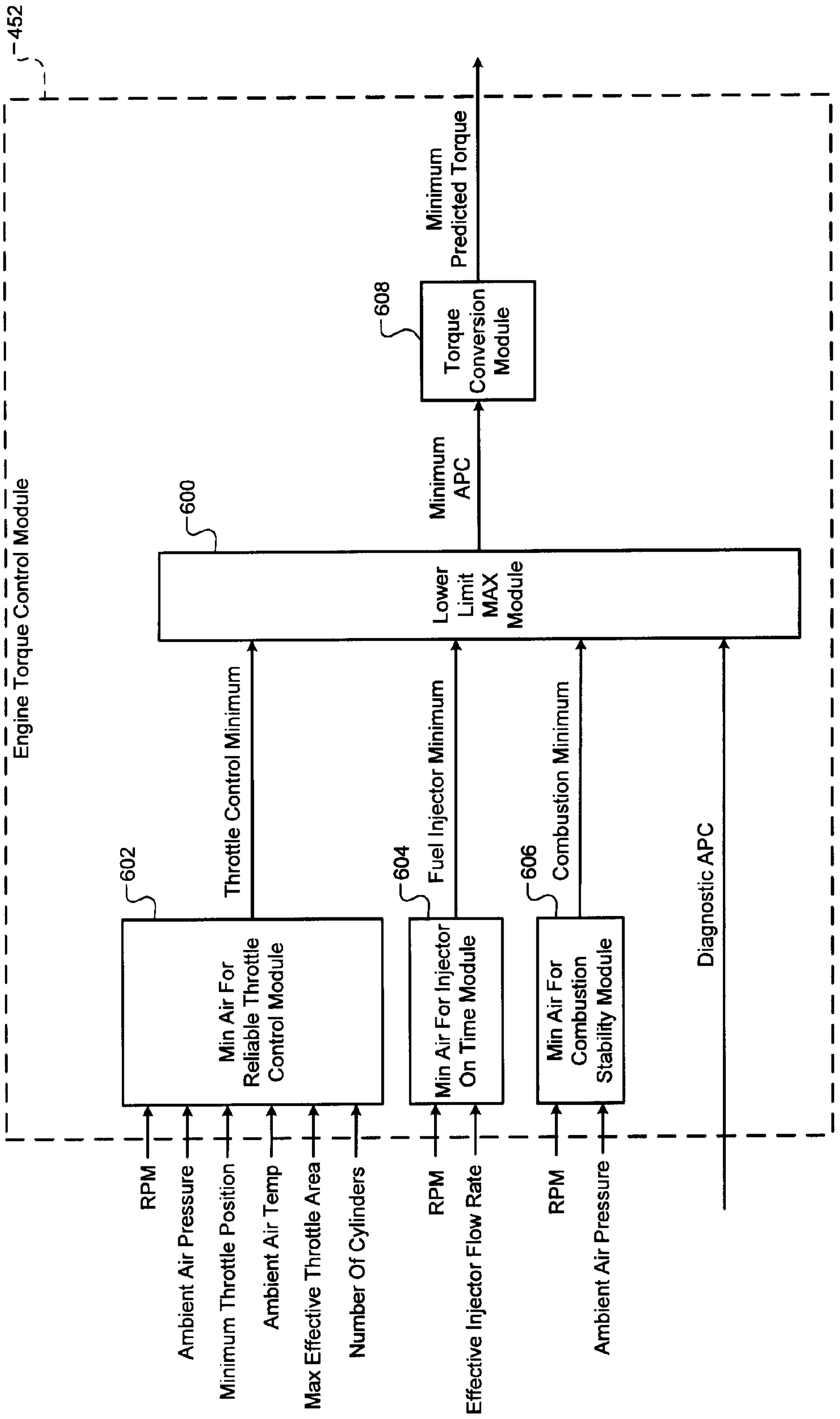
FIG. 6 is a functional block diagram of an exemplary implementation of the engine torque control module of FIG. 4 according to the principles of the present disclosure.

Referring now to FIG. 6, a functional block diagram of an exemplary implementation of the engine torque control module of FIG. 4 is shown. The engine torque control module 452 determines the minimum APC that is achievable. For example, the minimum APC may be based on one or more of minimum controllable throttle position, minimum consistent fuel injector on time, minimum air density for self-sustaining combustion, and minimum air flow for POPD testing. A lower limit max module 600 determines a lower limit of achievable APC based on, for example only, whichever of the minimum controllable throttle position, the minimum consistent fuel injector on time, the minimum air density for self-sustaining combustion, and the minimum air flow for POPD testing correspond to a greater minimum APC.

The minimum APC required to maintain a controllable throttle position can be determined by a minimum air for reliable throttle control module 602. The minimum air for reliable throttle control module 602 may calculate the minimum air based on several inputs. For example, a first input may include a rotating engine speed in RPM. A second input may include barometric pressure, which may be referred to as ambient air pressure, and may be low-pass filtered.

A third input may be the minimum throttle position as a percentage of maximum position, i.e., wide-open throttle (WOT). Completely closing the throttle may cause the throttle to become mechanically stuck in the throttle bore. A minimum throttle position calibration may therefore limit how completely closed the throttle may be. A fourth input may include the temperature of the air outside of the vehicle (i.e. ambient air). This temperature may be estimated from a fuel system temperature sensor operating under certain conditions instead of being read from a dedicated sensor.

A fifth input may include the maximum effective area of the throttle bore, in millimeters squared, when the throttle is wide open. This effective area may be a geometric measurement or may be inferred from an air flow measurement test that incorporates the throttle body discharge coefficient. A sixth input may include the number of cylinders in the engine, which may come from a calibration. Alternatively, the number of cylinders may change as selected cylinders are deactivated.

The fuel injectors may introduce another limit as a result of not being able to open and close instantaneously. The fuel injectors may have a minimum on time for which they must be driven. Without the minimum on time, the fuel injectors may effectively stay closed or may open to an indeterminable position. The minimum on time creates a minimum amount of fuel that can reliably be delivered into the cylinder. Since gasoline engines are typically run at a fixed air/fuel ratio, this minimum possible fuel delivered limit in turn creates a minimum APC limit.

Minimum air dictated by minimum injector on time can be determined by a min air for injector on time module 604. The min air for injector on time module 604 can perform its calculation based on engine RPM and the current effective injector flow rate in milligrams/second. The current effective injector flow rate may be a function of the pressure across the injector and the orifice size.

Another APC limit may result from the requirement of stable combustion. If fuel droplets are too widely spaced in the combustion chamber, there may not be enough heat transferred from the burning of one molecule to its neighbors to get self-sustaining combustion. In such a case, combustion starts at the spark plug but fails to ignite all the other droplets in the combustion chamber. The unburned fuel droplets then go out the exhaust port, and may damage the catalyst.

This limit is typically observed by calibrators using combustion quality measuring equipment as a wide variance in indicated mean effective pressure, which can be transformed into a coefficient of variance number, or COV. This limit may also be observed by monitoring the catalyst temperature in engines with catalyst temperature sensors. Catalyst temperatures start climbing when unburned fuel droplets reach the catalyst.

Minimum air required for acceptable combustion stability can be determined by a min air for combustion stability module 606. The min air for combustion stability module 606 can perform its calculation based on engine RPM and ambient air pressure.

Minimum air for POPD testing is requested by the diagnostic control module 500. The diagnostic control module 500 may store a value for minimum APC. The diagnostic control module 500 may request the minimum APC when lean to rich transitions of POPD testing occur. It is anticipated that the diagnostic control module 500 may request the minimum APC when rich to lean transitions of POPD testing occur.

The maximum of the potential minimum APC limits is determined by the lower limit max module 600. The lower limit max module 600 outputs the desired APC to a torque conversion module 608. The torque conversion module 608 converts the desired APC to the minimum predicted torque. The torque conversion module 608 outputs the minimum predicted torque to the propulsion torque arbitration module 406.

Figure 7:
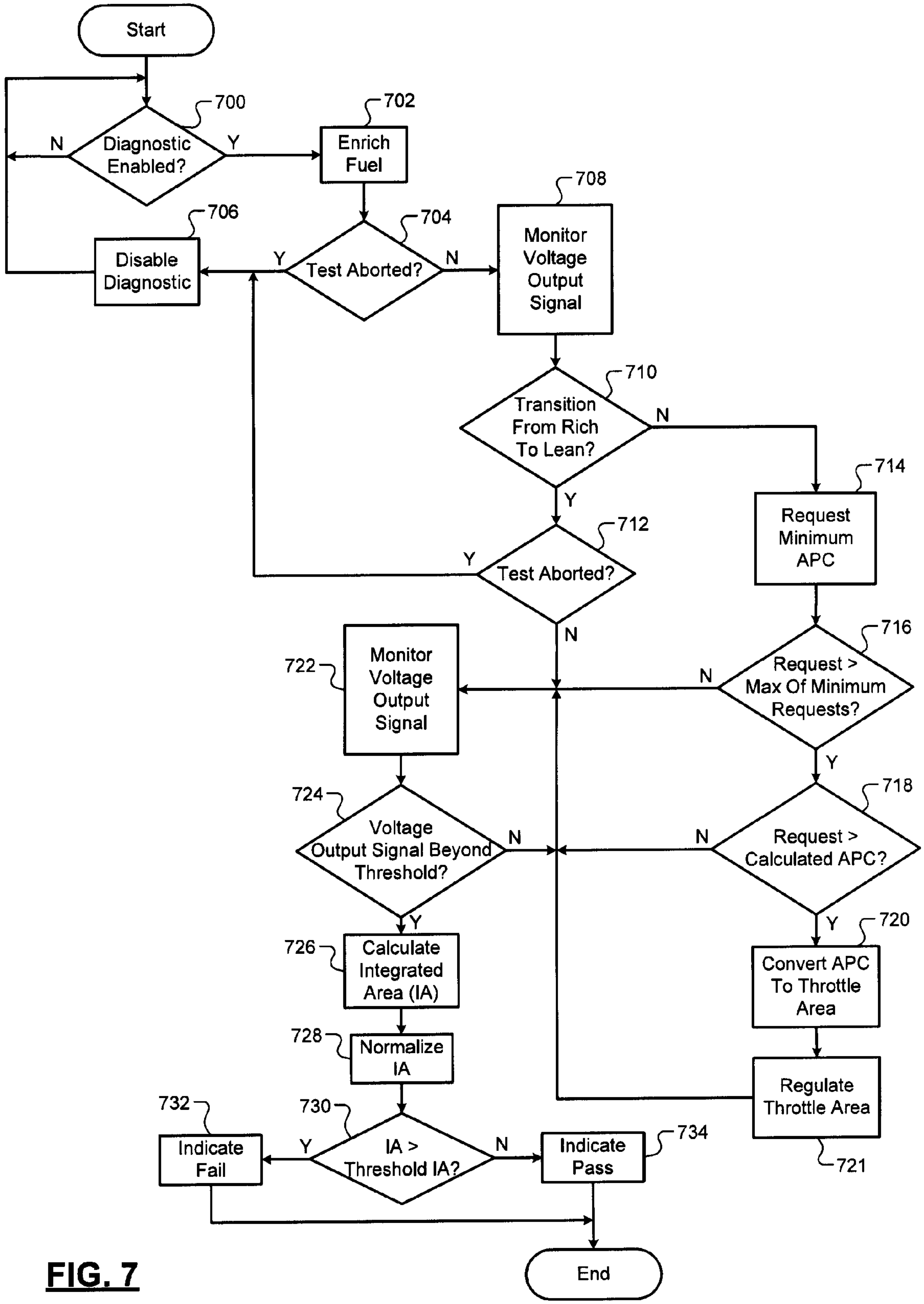
FIG. 7 is a flowchart that depicts exemplary steps performed in conducting post-converter $O_2$ sensor performance diagnostics according to the principles of the present disclosure.

In FIG. 7, a flowchart that depicts exemplary steps performed in conducting post-converter $O_2$ sensor performance diagnostics according to the principles of the present disclosure is shown. In step 700, control determines whether diagnostic testing is enabled. For example only, diagnostic testing may be enabled when non-intrusive conditions exist. If diagnostic testing is enabled, control transfers to step 702; otherwise, control returns to step 700. In step 702, control enriches an air/fuel mixture with fuel. In step 704, control determines whether the diagnostic test is aborted. For example only, diagnostic testing may be aborted when more torque is requested. If the diagnostic test is aborted, control transfers to step 706; otherwise, control transfers to step 708.

In step 706, control disables diagnostic testing. In step 708, control monitors a voltage output signal. In step 710, control determines whether the air/fuel mixture is transitioning from rich to lean or lean to rich. If the air/fuel mixture is transitioning from rich to lean, control transfers to step 712; otherwise, control transfers to step 714. In step 712, control determines whether the diagnostic test is aborted. If the diagnostic test is aborted, control transfers to step 706; otherwise, control transfers to step 722.

In step 714, under lean to rich transition, control requests minimum APC. In step 716, control determines whether the requested minimum APC is greater than a maximum of other minimum APC requests. If the requested minimum APC is greater than the maximum of other minimum APC requests, control transfers to step 718; otherwise, control transfers to step 722.

In step 718, control determines whether the requested minimum APC is greater than a calculated APC request. If the requested minimum APC is greater than the calculated APC request, control transfers to step 720; otherwise, control transfers to step 722. In step 720, control converts the requested minimum APC to throttle area. In step 721, control regulates the throttle area to achieve the requested minimum APC.

In step 722, control monitors the voltage output signal. In step 724, control compares the voltage output signal to a threshold value. If the voltage output signal is beyond the threshold value, control transfers to step 726; otherwise, control returns to step 722. In step 726, control calculates the IA based on the voltage output signal. In step 728, control normalizes the IA.

In step 730, control compares the IA to a threshold IA. If the IA is greater than the threshold IA, control transfers to step 732; otherwise, control transfers to step 734. In step 732, control indicates a failure and control ends. In step 734, control indicates a pass and control ends.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
an oxygen ($O_2$) sensor diagnostic module that diagnoses an $O_2$ sensor and requests a minimum air per cylinder (APC); and
a throttle actuator module that controls a throttle to adjust a mass air flow based on said minimum APC.

2. The engine control system of claim 1 wherein said $O_2$ sensor diagnostic module requests a lean to rich transition and requests said minimum APC during said lean to rich transition.

3. The engine control system of claim 1 wherein said throttle actuator module controls said throttle based on said minimum APC when said minimum APC is a maximum of a plurality of APC requests.

4. The engine control system of claim 1 wherein said throttle actuator module suspends controlling said throttle based on said minimum APC when said minimum APC is less than at least one of a plurality of APC requests.

5. The engine control system of claim 1 wherein said minimum APC includes a predetermined value.

6. The engine control system of claim 1 wherein said $O_2$ sensor diagnostic module requests a rich to lean transition and requests said minimum APC during said rich to lean transition.

7. The engine control system of claim 1 wherein said $O_2$ sensor diagnostic module requests said minimum APC before diagnosis of said $O_2$ sensor.

8. The engine control system of claim 7 wherein said $O_2$ sensor diagnostic module suspends requesting said minimum APC after diagnosis of said $O_2$ sensor.

9. The engine control system of claim 1 wherein said $O_2$ sensor diagnostic module requests said minimum APC during diagnosis of said $O_2$ sensor.

10. The engine control system of claim 9 wherein said $O_2$ sensor diagnostic module suspends requesting said minimum APC after diagnosis of said $O_2$ sensor.

11. A method for controlling an engine comprising:
requesting a minimum air per cylinder (APC);
controlling a throttle to adjust a mass air flow based on said minimum APC; and
diagnosing an $O_2$ sensor based on said APC.

12. The method of claim 11 further comprising:
requesting a lean to rich transition; and requesting said minimum APC during said lean to rich transition.

13. The method of claim 11 further comprising controlling said throttle based on said minimum APC when said minimum APC is a maximum of a plurality of APC requests.

14. The method of claim 11 further comprising suspending controlling said throttle based on said minimum APC when said minimum APC is less than at least one of a plurality of APC requests.

15. The method of claim 11 wherein said minimum APC includes a predetermined value.

16. The method of claim 11 further comprising:

requesting a rich to lean transition; and requesting said minimum APC during said rich to lean transition.

17. The method of claim 11 further comprising requesting said minimum APC before diagnosis of said $O_2$ sensor.

18. The method of claim 17 further comprising suspending requesting said minimum APC after diagnosis of said $O_2$ sensor.

19. The method of claim 11 further comprising requesting said minimum APC during diagnosis of said $O_2$ sensor.

20. The method of claim 19 further comprising suspending requesting said minimum APC after diagnosis of said $O_2$ sensor.

* * * * *